United States Patent
Tomioka (10) Patent No.: US 10,409,058 B2
(45) Date of Patent: Sep. 10, 2019

(54) IN-VEHICLE DISPLAY SYSTEM, CONTROL APPARATUS, AND DISPLAY APPARATUS

(71) Applicant: DENSO CORPORATION, Kariya, Aichi-pref. (JP)

(72) Inventor: Shun Tomioka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/743,802

(22) PCT Filed: Aug. 8, 2016

(86) PCT No.: PCT/JP2016/073330
§ 371 (c)(1),
(2) Date: Jan. 11, 2018

(87) PCT Pub. No.: WO2017/026454
PCT Pub. Date: Feb. 16, 2017

(65) Prior Publication Data
US 2018/0203226 A1      Jul. 19, 2018

(30) Foreign Application Priority Data

Aug. 10, 2015   (JP) .................................. 2015-158148

(51) Int. Cl.
*G02B 27/01* (2006.01)
*G06F 3/14* (2006.01)
(Continued)

(52) U.S. Cl.
CPC .............. *G02B 27/01* (2013.01); *B60K 35/00* (2013.01); *B60K 37/02* (2013.01); *G06F 3/1423* (2013.01);
(Continued)

(58) Field of Classification Search
CPC ...... G06F 3/1423; G06F 3/1431; G06F 11/07; G06F 11/0739; G09G 3/006; G09G 2330/12; G09G 2360/04; G09G 2380/10
See application file for complete search history.

(56) References Cited

U.S. PATENT DOCUMENTS

| | | | | |
|---|---|---|---|---|
| 2009/0115592 A1* | 5/2009 | Miake | ..................... | G09G 5/363 340/459 |
| 2013/0038584 A1* | 2/2013 | Burgin | ...................... | G09F 9/30 345/205 |
| 2016/0189581 A1* | 6/2016 | Hwang | .................. | G09G 3/006 345/691 |

FOREIGN PATENT DOCUMENTS

JP       H06309129 A       11/1994
JP       H10129300 A        5/1998
(Continued)

*Primary Examiner* — Md Saiful A Siddiqui
(74) *Attorney, Agent, or Firm* — Harness, Dickey & Pierce, P.L.C.

(57) ABSTRACT

An in-vehicle display system includes: display apparatuses that are mounted in a vehicle; and a single control apparatus that is configured to generate image information, output the image information to assigned one of the display apparatuses, and cause a display apparatus assigned to display the image information. A certain display apparatus that is at least one of the display apparatuses includes a first detection portion configured to detect malfunction, a second detection portion configured to detect malfunction of the control apparatus, a transmission portion configured to transmit detection information indicating the malfunction of the certain display apparatus, and a substitute control portion configured to acquire a vehicle signal, generate image information, and display the image information. The control apparatus includes an output control portion configured to output the image information assigned to the certain display (Continued)

apparatus, and cause the different display apparatus to display the image information.

8 Claims, 6 Drawing Sheets

(51) Int. Cl.
*B60K 35/00* (2006.01)
*G06F 11/07* (2006.01)
*B60K 37/02* (2006.01)
*G09G 3/00* (2006.01)

(52) U.S. Cl.
CPC ............ *G06F 3/1431* (2013.01); *G06F 11/07* (2013.01); *G06F 11/0739* (2013.01); *G09G 3/006* (2013.01); *B60K 2350/1068* (2013.01); *B60K 2350/1096* (2013.01); *B60K 2350/2052* (2013.01); *G09G 2330/12* (2013.01); *G09G 2360/04* (2013.01); *G09G 2380/10* (2013.01)

(56) References Cited

FOREIGN PATENT DOCUMENTS

| | | | |
|---|---|---|---|
| JP | 2006268514 A | 10/2006 | |
| JP | 2013216182 A | 10/2013 | |

\* cited by examiner

IN-VEHICLE DISPLAY SYSTEM, CONTROL APPARATUS, AND DISPLAY APPARATUS

CROSS REFERENCE TO RELATED APPLICATIONS

This application is a U.S. National Phase Application under 35 U.S.C. 371 of International Application No. PCT/JP2016/073330 filed on Aug. 8, 2016 and published in Japanese as WO 2017/026454 A1 on Feb. 16, 2017. This application is based on and claims the benefit of priority from Japanese Patent Application No. 2015-158148 filed on Aug. 10, 2015. The entire disclosures of all of the above applications are incorporated herein by reference.

TECHNICAL FIELD

The present disclosure relates to an in-vehicle display system mounted in a vehicle.

BACKGROUND ART

A conventionally known in-vehicle display system mounted in a vehicle includes multiple display apparatuses disposed at multiple places in the vehicle, and a single or multiple control apparatus configured to output image information to the display apparatuses and cause the display apparatuses to display the image information. Such an in-vehicle display system has difficulty in operation of the vehicle in a case where any of the display apparatuses or the control apparatus malfunctions and fails to display information essentially required for operation, such as indication of a vehicle speed meter.

Patent Literature 1 discloses a technique applicable to an in-vehicle system including multiple display apparatuses and multiple detection devices corresponding to the control apparatus. This technique enables substitute display, when one of the display apparatuses or one of the detection devices malfunctions, by a different one of the normally operating display apparatuses or a different one of the normally operating detection devices.

PRIOR ART LITERATURE

Patent Literature

Patent Literature 1: JP 2013-216182 A

SUMMARY OF INVENTION

The technique according to Patent Literature 1 assumes that there are provided multiple display apparatuses and multiple control apparatus. The inventor thoroughly investigated to find that the technique disclosed in Patent Literature 1 is not applicable to an in-vehicle display system including multiple display apparatuses and a single control apparatus configured to output image information to the display apparatuses. Specifically, such a system including only one integrated control apparatus for multiple display apparatuses does not include a different substitute control apparatus when the single control apparatus malfunctions. The system thus needs to have a different measure.

It is an object of the present disclosure to provide a technique for substitute display of information necessary for operation in an in-vehicle display system including multiple display apparatuses and a single control apparatus, when any of the display apparatuses or the control apparatus malfunctions.

An in-vehicle display system according to an aspect of the present disclosure includes multiple display apparatuses, and a single control apparatus configured to output image information to one of the display apparatuses assigned as a display destination of the image information and cause the display apparatus to display the image information. Reference signs indicate correspondence to specific means disclosed in an embodiment to be described later as an aspect, and do not intend to limit the technical scope of the present disclosure.

At least certain one of the display apparatuses includes a first detection portion, a second detection portion, a transmission portion, and a substitute control portion. The first detection portion is configured to detect its own malfunction. The second detection portion is configured to detect malfunction of the control apparatus. The transmission portion transmits detection information indicating malfunction to the control apparatus when the first detection portion detects its own malfunction. The substitute control portion acquires a vehicle signal relevant to image information to be displayed by the substitute control portion when the second detection portion detects malfunction of the control apparatus, generates image information in accordance with the acquired vehicle signal, and displays the image information. The control portion includes an output control portion. Upon receipt of the detection information indicating malfunction from the certain display apparatus, the output control portion outputs the image information assigned to the certain display apparatus as a display destination to a different one of the display apparatuses, and causes the different display apparatus to display the image information.

According to the in-vehicle display system, the display apparatus can self-acquire a vehicle signal and display image information in accordance with the acquired vehicle signal in an exemplary case where malfunction is detected in the single control apparatus. Furthermore, when malfunction is detected in a certain one of the display apparatuses, a different one of the display apparatuses can execute substitute display of image information to be displayed by the malfunctioning display apparatus. In the present configuration, information necessary for operation can be kept displayed even when any of the display apparatuses or the control apparatus malfunctions in the in-vehicle display system including the multiple display apparatuses and the single control apparatus.

EMBODIMENT FOR CARRYING OUT INVENTION

An embodiment of the present disclosure will be described below with reference to the drawings. The present disclosure is not limited to the following embodiment but can be embodied in various modes.

(Description of Configuration of In-Vehicle Display System)

Figure 1:
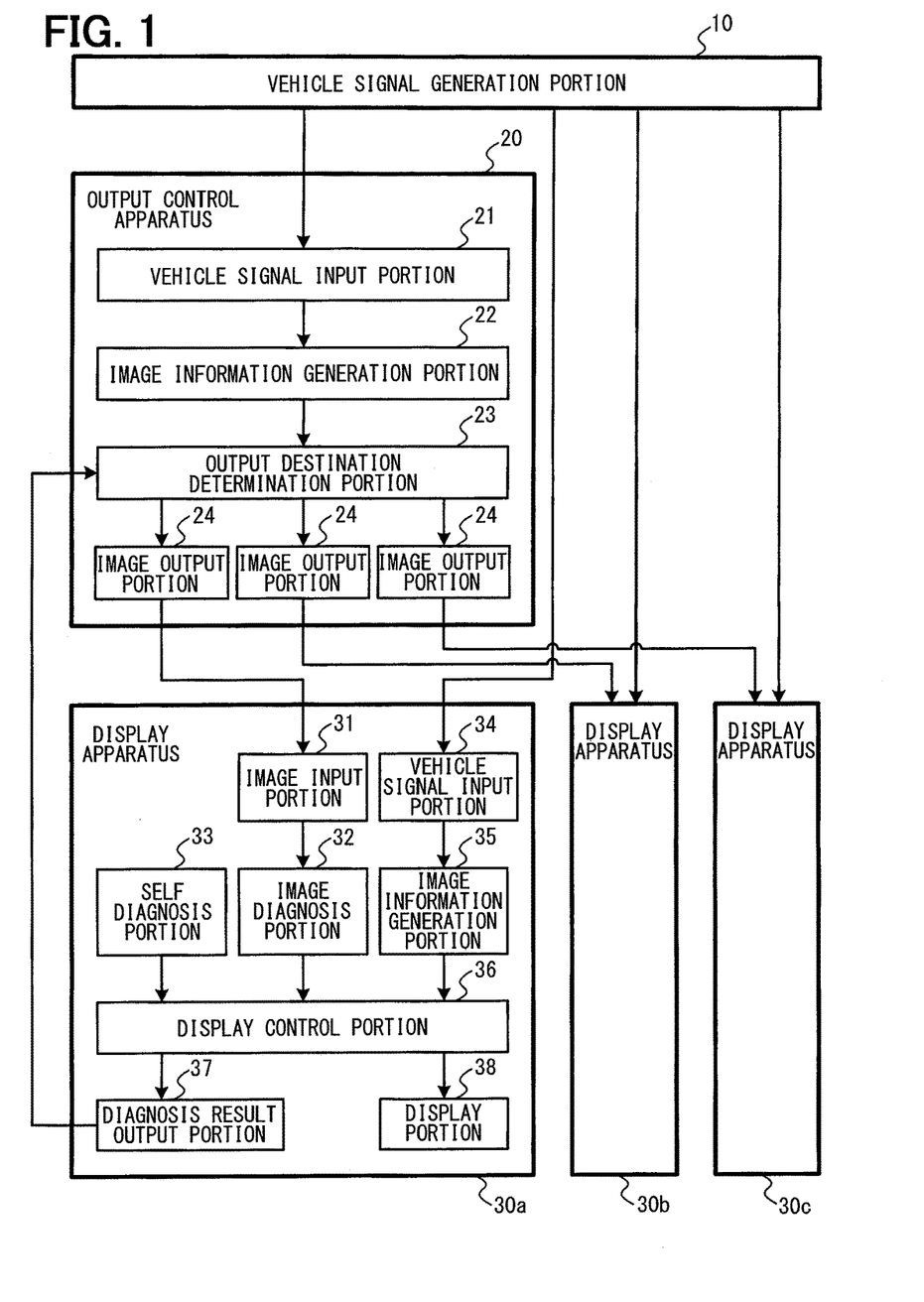
FIG. 1 is a block diagram illustrating a configuration of an in-vehicle display system.

A configuration of an in-vehicle display system according to the embodiment will now be described with reference to FIG. 1. As exemplarily depicted in FIG. 1, the in-vehicle display system includes a single output control apparatus 20, and multiple display apparatuses 30a, 30b, and 30c. The in-vehicle display system functions to generate image information in accordance with a vehicle signal outputted from a vehicle signal generation portion 10 and display the generated image information. FIG. 1 depicts the display apparatuses 30 having reference signs followed by "a", "b", and "c". The following description may not refer to "a", "b", and "c" following the reference sign. In this case, assume that the display apparatuses 30 include all the display apparatuses 30a, 30b, and 30c.

The vehicle signal generation portion 10 includes an instrument group configured to generate and output a vehicle signal that is subject to be displayed by the in-vehicle display system. The vehicle signal generation portion 10 includes a sensor configured to detect any of various states of the vehicle and output a vehicle signal indicating the detected state, an in-vehicle instrument configured to output a video content as a vehicle signal, or the like.

Examples of the sensor configured to output the vehicle state include a vehicle speed sensor configured to output vehicle speed, a rotational speed sensor configured to output engine rotational speed, and a range meter configured to output travel distance. The examples of the sensor further include a charge sensor configured to output a state of charge of a storage cell, a brake sensor configured to output a state of a brake device, a hydraulic sensor configured to output a pressure state of engine oil, and a water temperature sensor configured to output temperature of engine cooling water. The examples of the sensor also include a shift position sensor configured to output a shift position, a direction indicator sensor configured to output an operating state of a direction indicator lamp, an open/close sensor configured to output an open/closed state of a door, and a head lamp sensor configured to output an operating state of a head lamp. Examples of the in-vehicle instrument configured to output a video content include a navigation system, a video sound instrument, and an integrated system configured to integrally operate various in-vehicle instruments with menu display.

The output control apparatus 20 is an electronic control apparatus functioning to generate an image information piece in accordance with a vehicle signal outputted from the vehicle signal generation portion 10 and output to an assigned one of the display apparatuses 30 relevant to the image information piece. The output control apparatus 20 includes functional configurations of a vehicle signal input portion 21, an image information generation portion 22, an output destination determination portion 23, and an image output portion 24.

The vehicle signal input portion 21 is an input interface configured to receive a vehicle signal outputted from each of the sensors and the instruments configuring the vehicle signal generation portion 10. The image information generation portion 22 images information indicated by the vehicle signal received via the vehicle signal input portion 21 and generates image information.

The output destination determination portion 23 functions to output the image information generated by the image information generation portion 22 to one of the display apparatuses 30 as an output destination. The output destination determination portion 23 determines the display apparatus 30 as the output destination for the image information generated by the image information generation portion 22, and outputs the image information to the image output portion 24 corresponding to the determined display apparatus 30.

Specifically, during normal operation with the display apparatuses 30 having no abnormality (hereinafter, also referred to as a normal operation mode), the output destination determination portion 23 determines one of the display apparatuses 30 as an output destination of each image information piece in accordance with output destination setting corresponding to types of image information pieces. Assume that the output control apparatus 20 pre-stores correspondence between image information and one of the display apparatuses 30 as an output destination configured to display the image information. In a case where abnormality is detected in one of the display apparatuses 30, the output destination determination portion 23 outputs, to a different substitute one of the display apparatuses 30, only certain image information necessary for operation, out of image information assigned to the abnormal display apparatus 30 as an output destination.

The present configuration allows, when part of the display apparatuses 30 malfunctions, a different normal one of the display apparatuses 30 to execute substitute display of image information necessary for operation, out of image information to be displayed by the malfunctioning display apparatus 30. The output destination determination portion 23 further functions to output, to each of the display apparatuses 30, pre-stored image information for malfunction diagnosis of the output control apparatus 20 (hereinafter, referred to as a test image). The display apparatuses 30 are each assumed to store image information similar to the test image.

Each of the image output portions 24 is an output interface for a corresponding one of the display apparatuses 30a, 30b, and 30c. The image output portion 24 transmits image information outputted from the output destination determination portion 23 to the corresponding display apparatus 30.

The display apparatuses 30 are in-vehicle instruments configured to display image information for a driver. The display apparatuses are embodied by a meter panel disposed ahead of a driver's seat, a center display disposed in a center part of an instrument panel, a head up display configured to project video in forward driving visibility of the driver, or the like.

The display apparatuses 30 each include functional configurations of an image input portion 31, an image diagnosis portion 32, a self-diagnosis portion 33, a vehicle signal input portion 34, an image information generation portion 35, a display control portion 36, a diagnostic result output portion 37, and a display portion 38. FIG. 1 depicts the functional configurations only for the display apparatus 30a. The display apparatuses 30b and 30c are each assumed to have similar functional configurations.

The image input portion 31 is an input interface configured to receive image information outputted from the output control apparatus 20. The image diagnosis portion 32 inspects the test image received from the output control apparatus 20 via the image input portion 31 to determine whether or not the output control apparatus 20 malfunctions. Specifically, the image diagnosis portion 32 compares the test image received from the output control apparatus 20 and the test image pre-stored in the corresponding display apparatus 30. When there is found any difference between the test images through the comparison, the image diagnosis portion 32 determines that the output control apparatus 20 malfunctions.

The self-diagnosis portion 33 inspects an internal circuit of the corresponding display apparatus 30 and determines whether or not there is malfunction relevant to display of image information. The vehicle signal input portion 34 is an input interface configured to receive a vehicle signal outputted from each of the sensors and the instruments configuring the vehicle signal generation portion 10. The image information generation portion 35 images information indicated by the vehicle signal received via the vehicle signal input portion 34 and generates image information.

The display control portion 36 functions to integrally control operation of the display apparatus 30. During normal operation with neither the corresponding display apparatus 30 nor the output control apparatus 20 having abnormality, the display control portion 36 causes the display portion 38 to display the image information received from the output control apparatus 20 via the image input portion 31. Under a contrast condition where the output control apparatus 20 is determined as malfunctioning, the display control portion 36 acquires, via the vehicle signal input portion 34, a vehicle signal relevant to image information to be displayed by the display control portion 36, and causes the display portion 38 to display the image information imaged by the image information generation portion 35 in accordance with the acquired vehicle signal.

The diagnostic result output portion 37 is an output interface configured to transmit, to the output control apparatus 20, diagnostic result information indicating a result of diagnosis by the self-diagnosis portion 33. The display portion 38 is embodied by a display apparatus such as a liquid crystal panel. The display portion 38 displays an image in accordance with image information outputted from the display control portion 36.

(Description of Processing Executed by Output Control Apparatus)

Figure 2:
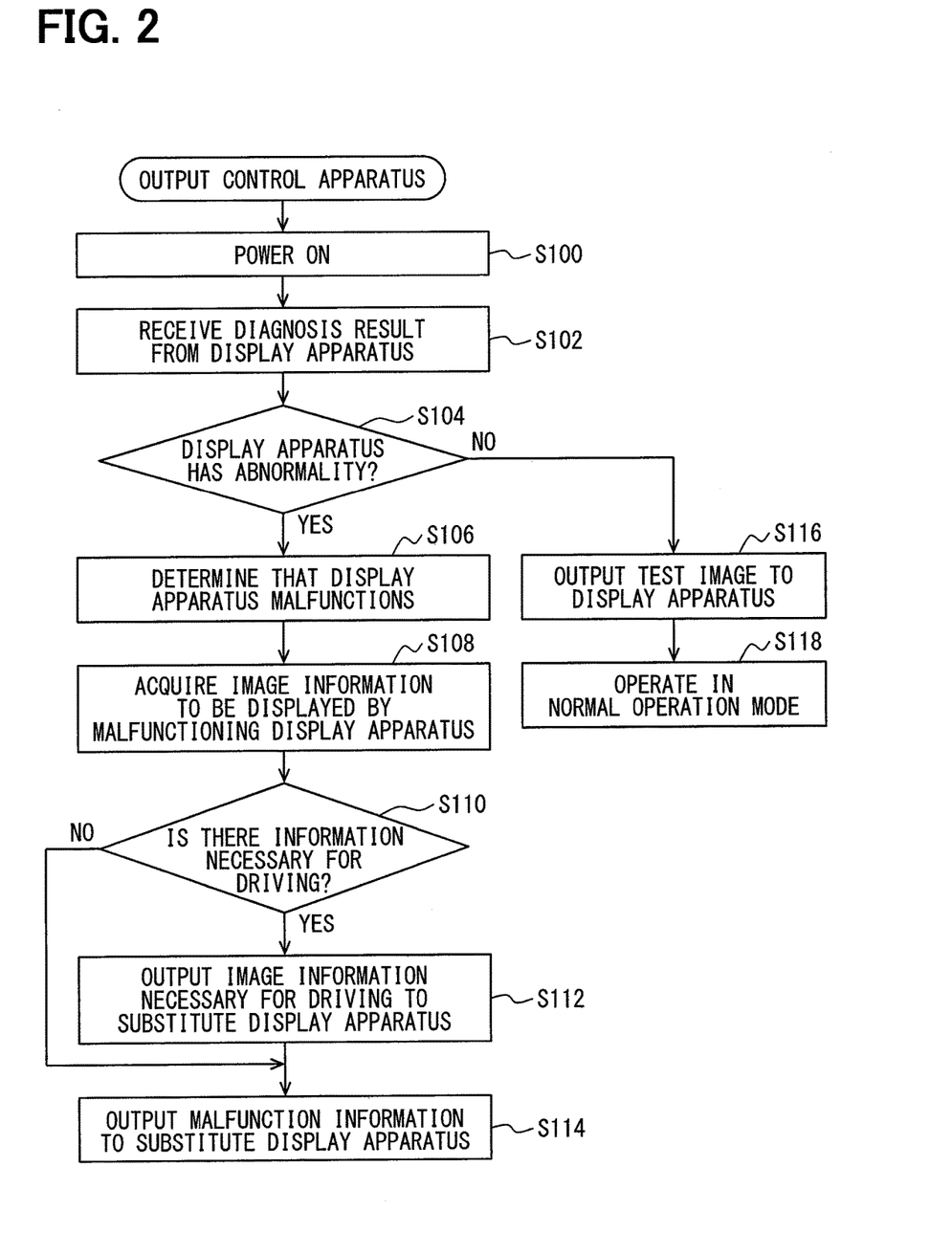
FIG. 2 is a flowchart illustrating a procedure of processing executed by an output control apparatus.

A procedure of processing executed by the respective portions of the output control apparatus 20 will be described with reference to a flowchart in FIG. 2.

In S100, the in-vehicle display system is powered on and the output control apparatus 20 is activated to start processing. In S102, the output destination determination portion 23 receives a diagnostic result outputted from each of the display apparatuses 30. The diagnostic result is information indicating a result of own malfunction diagnosis by each of the display apparatuses 30. In S104, the output destination determination portion 23 determines whether or not any of the display apparatuses 30 has abnormality in accordance with the diagnostic results received in S102. The process flow of the output destination determination portion 23 proceeds to S106 when any of the display apparatuses 30 has abnormality (YES in S104).

In S106, the output destination determination portion 23 determines that the display apparatus 30 determined as having abnormality in S104 malfunctions. In S108, the output destination determination portion 23 acquires, from the image information generation portion 22, image information to be displayed by the display apparatus 30 determined as malfunctioning in S106.

In S110, the output destination determination portion 23 determines whether or not the image information acquired in S108 includes certain information necessary for operation. Such information necessary for operation corresponds to, out of image information to be displayed by the display apparatus 30 determined as malfunctioning, part of information predetermined as being minimum required for operation of the vehicle, such as information legally required to be displayed or information significant for continuous travel of the vehicle. Specifically, examples of such information include vehicle speed, engine rotational speed, and total travel distance. Assume that the output control apparatus 20 pre-stores a necessary condition of information minimum required for vehicle operation.

When there is no information necessary for operation (NO in S110), the process flow of the output destination determination portion 23 proceeds to S114. When there is certain information necessary for operation (YES in S110), the process flow of the output destination determination portion 23 proceeds to S112. In S112, the output destination determination portion 23 outputs the image information necessary for operation as determined in S110 to a substitute one of the display apparatuses 30 having no abnormality detected. In S114, the output destination determination portion 23 outputs, to the substitute display apparatus 30, malfunction information on the display apparatus 30 determined as malfunctioning.

When all the display apparatuses 30 are determined as having no abnormality in S104 (NO in S104), the process flow of the output destination determination portion 23 proceeds to S116. In S116, the output destination determination portion 23 outputs the test image stored in the output control apparatus 20 to each of the display apparatuses 30. In S118, the output destination determination portion 23 executes operation in the normal operation mode. In the normal operation mode, the output destination determination portion 23 determines an output destination relevant to each image information piece outputted from the image information generation portion 22 in accordance with output destination setting pre-stored in the output control apparatus 20, and outputs the image information to the display apparatus 30 determined as the output destination.

(Description of Processing Executed by Display Apparatus)

Figure 3:
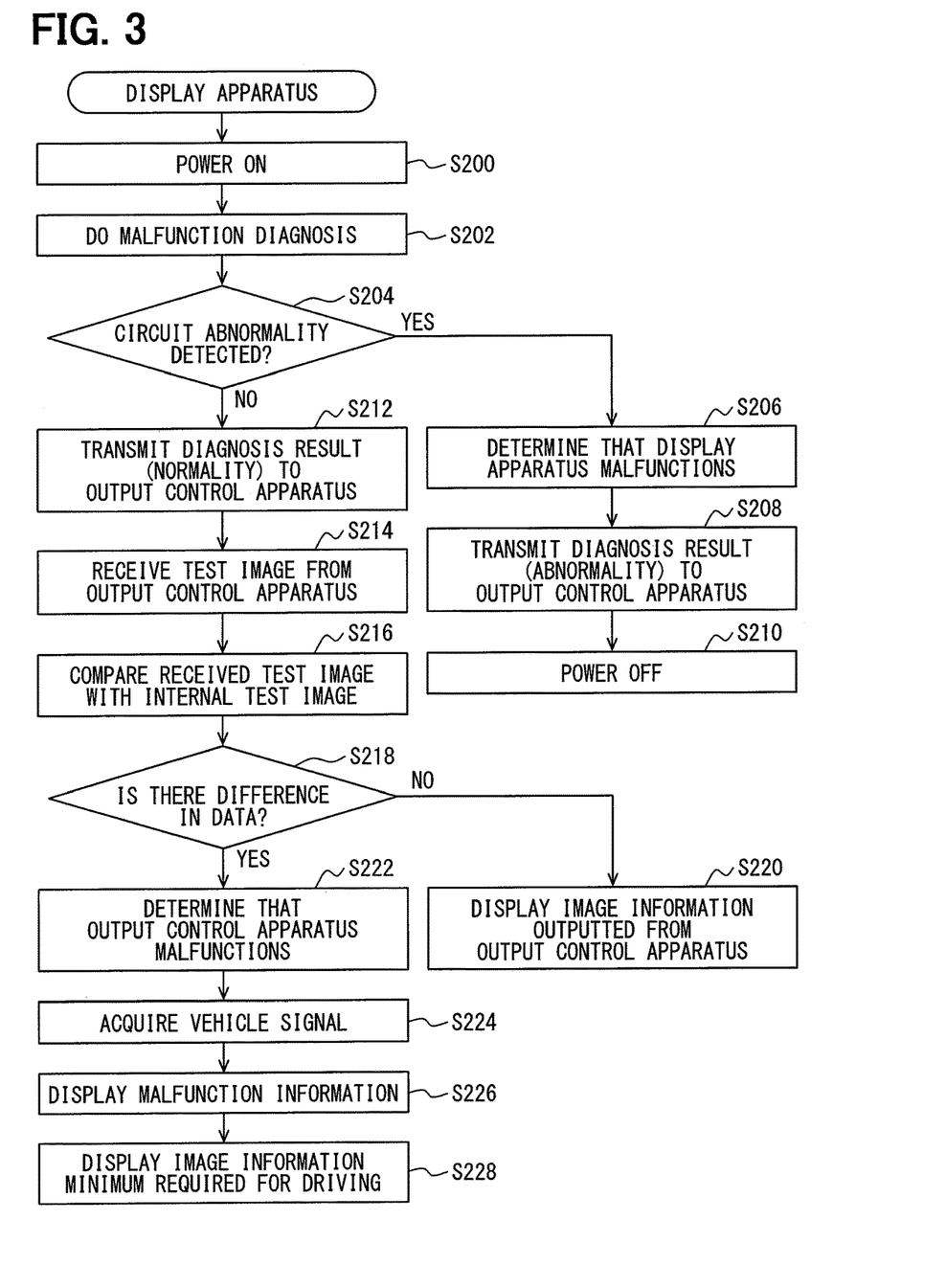
FIG. 3 is a flowchart illustrating a procedure of processing executed by a display apparatus.

A procedure of processing executed by the respective portions of the display apparatus 30 will be described with reference to a flowchart in FIG. 3.

In S200, the in-vehicle display system is powered on and the display apparatus 30 is activated to start processing. In S202, the self-diagnosis portion 33 executes malfunction diagnosis. In S204, the self-diagnosis portion 33 determines whether or not circuit abnormality is detected through malfunction diagnosis in S202. When circuit abnormality is detected (YES in S204), the process flow of the display control portion 36 proceeds to S206. In S206, the display control portion 36 determines that the corresponding display apparatus 30 malfunctions. In S208, the display control portion 36 transmits a diagnostic result indicating abnormality of the corresponding display apparatus 30 to the output control apparatus 20 via the diagnostic result output portion 37. In S210, the display control portion 36 powers off the corresponding display apparatus 30.

When determined that there is no circuit abnormality in S204 (NO in S204), the process flow of the display control portion 36 proceeds to S212. In S212, the display control portion 36 transmits a diagnostic result indicating normality of the corresponding display apparatus 30 to the output control apparatus 20 via the diagnostic result output portion 37. In S214, the image input portion 31 receives the test image transmitted from the output control apparatus 20. The test image is image information transmitted in S116 in the processing executed by the output control apparatus 20 (see FIG. 2).

In S216, the image diagnosis portion 32 compares the test image received in S214 and the internal test image stored in the corresponding display apparatus 30. In S218, the image diagnosis portion 32 determines whether or not there is any difference in data between these two test images in accordance with a result of the comparison in S216. When there is no difference in data between the two test images (NO in S218), the process flow of the display control portion 36 proceeds to S220. In S220, the display control portion 36 causes the display portion 38 to successively display image information received from the output control apparatus 20 via the image input portion 31. The display control portion 36 then continues the processing in S220.

The image information received from the output control apparatus 20 includes the image information outputted from the output control apparatus 20 as information relevant to the corresponding display apparatus 30 in the normal operation mode. The image information can occasionally further include image information outputted from the output control apparatus 20 for substitute display in place of a different malfunctioning one of the display apparatuses 30, or image information indicating malfunction of the different display apparatus 30.

When the two test images are determined as being different in data in S218 (YES in S204), the process flow of the display control portion 36 proceeds to S222. In S222, the display control portion 36 determines that the output control apparatus 20 malfunctions. In S224, the display control portion 36 acquires, from the vehicle signal generation portion 10 via the vehicle signal input portion 34, a vehicle signal relevant to image information to be displayed by the display apparatus 30.

In S226, the display control portion 36 causes the display portion 38 to display malfunction information indicating that the output control apparatus 20 malfunctions. In S228, the display control portion 36 causes the display portion 38 to display certain information necessary for operation, out of image information generated by the image information generation portion 35 in accordance with the vehicle signal acquired in S224. Such information necessary for operation corresponds to, out of image information to be displayed by each of the display apparatuses 30, part of information preliminarily determined as being minimum required for operation of the vehicle, such as information legally required to be displayed or information significant for continuous travel of the vehicle. Assume that each of the display apparatuses 30 preliminarily stores a necessary condition of information minimum required for vehicle operation. The display control portion 36 then continues the processing in S228 and S230.

(Description of Exemplary Control)

Specific exemplary control in the in-vehicle display system according to the embodiment will now be described with reference to FIGS. 4 to 6.

Figure 4:
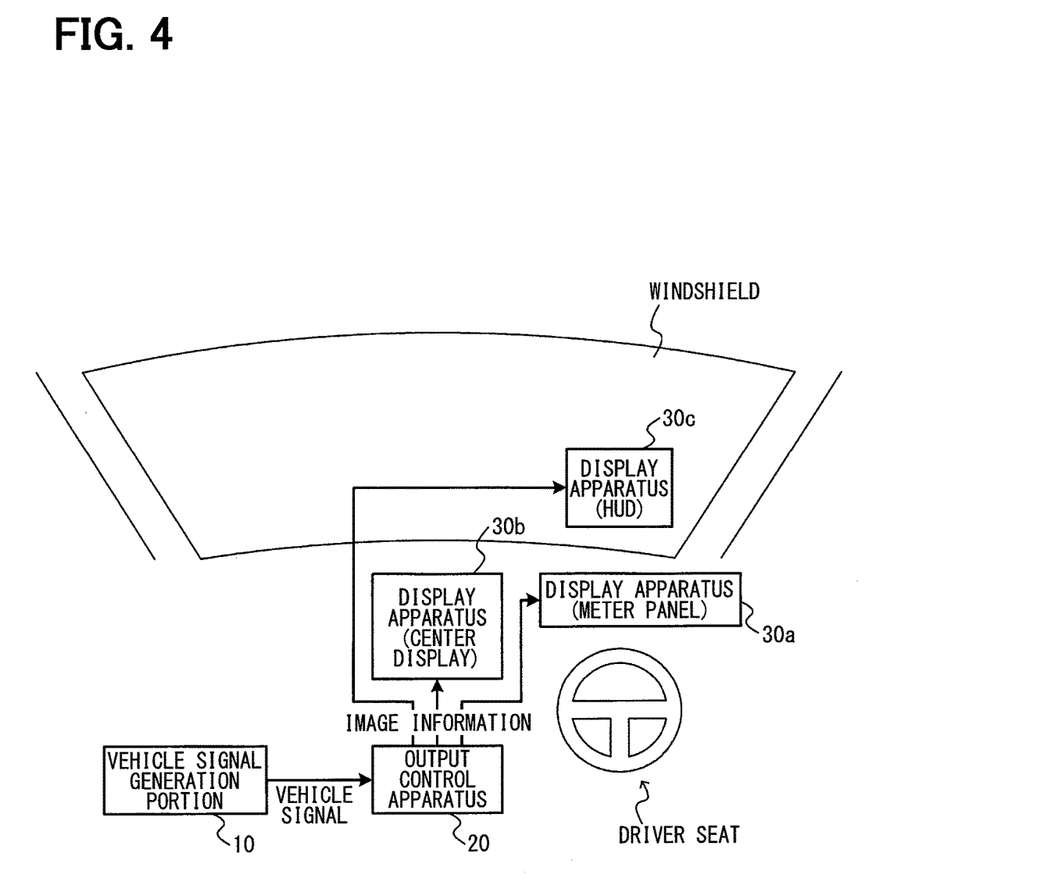
FIG. 4 is a view illustrating an exemplary control in a normal state.

FIG. 4 assumes an exemplary case where the output control apparatus 20 and the display apparatuses 30 all operate normally. This example assumes that the display apparatuses 30a, 30b, and 30c are configured by a meter panel, a center display, and a head up display, respectively. The same applies to FIGS. 5 and 6.

As exemplarily depicted in FIG. 4, during normal operation, image information is generated in accordance with a vehicle signal acquired by the output control apparatus 20 from the vehicle signal generation portion 10. The output control apparatus 20 outputs each image information piece to a corresponding one of the display apparatuses 30 as an output destination of the image information piece. The display apparatuses 30 each display information in accordance with the image information outputted from the output control apparatus 20.

Figure 5:
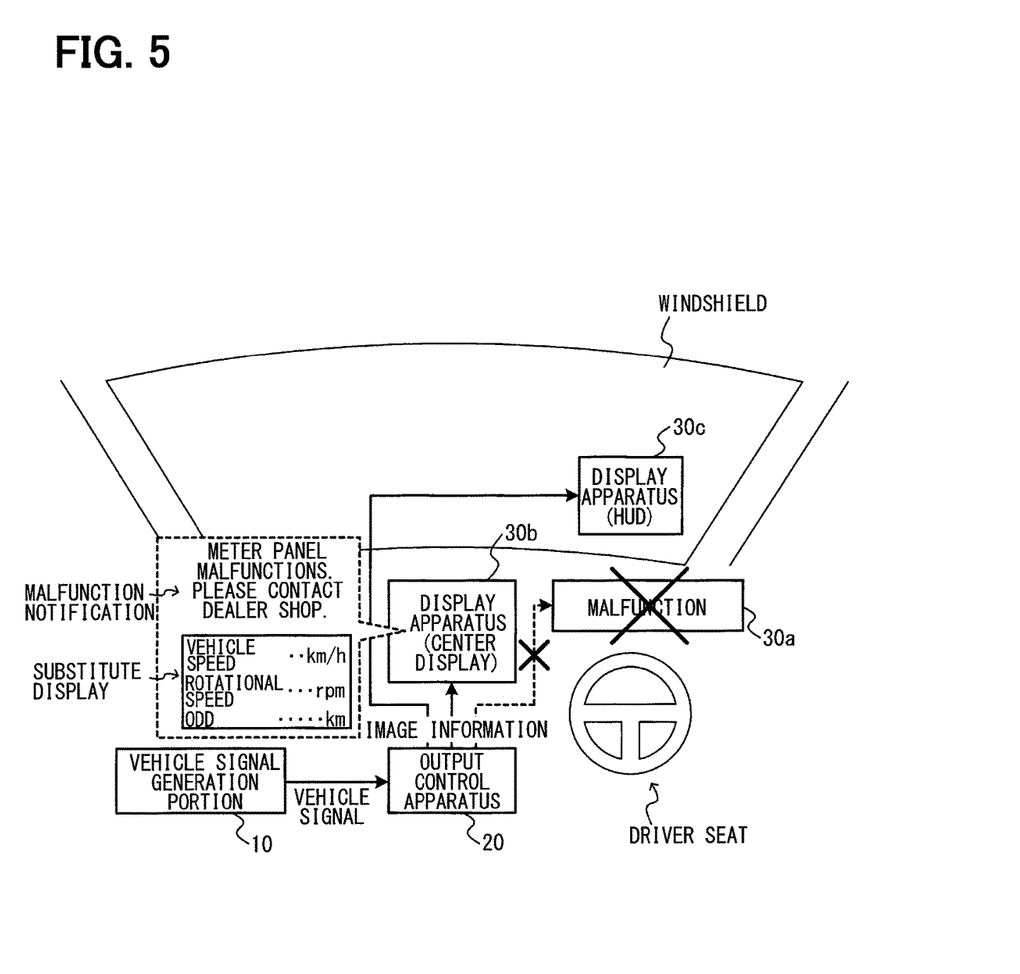
FIG. 5 is a view illustrating an exemplary control in a case where a display apparatus malfunctions.

FIG. 5 assumes an exemplary case where the display apparatus 30a (i.e. the meter panel) malfunctions. In the example, the output control apparatus 20 outputs, to the substitute display apparatus 30b (i.e. the center display), minimum required image information out of image information to be displayed by the malfunctioning display apparatus 30a, and malfunction information indicating that the meter panel malfunctions. The display apparatus 30b executes malfunction notification and substitute display in accordance with the image information and the malfunction information received from the output control apparatus 20.

As exemplarily depicted in FIG. 5, the center display executes substitute display of vehicle speed, engine rotational speed, and total travel distance, as minimum required information out of information to be displayed by the meter panel. The center display also displays malfunction notification recommending repair of the malfunctioning meter panel. The display apparatus 30c, which is not assigned as a substitute of the display apparatus 30a determined as malfunctioning, is assumed to normally receive image information relevant to the display apparatus 30c from the output control apparatus 20 and display the image information.

Figure 6:
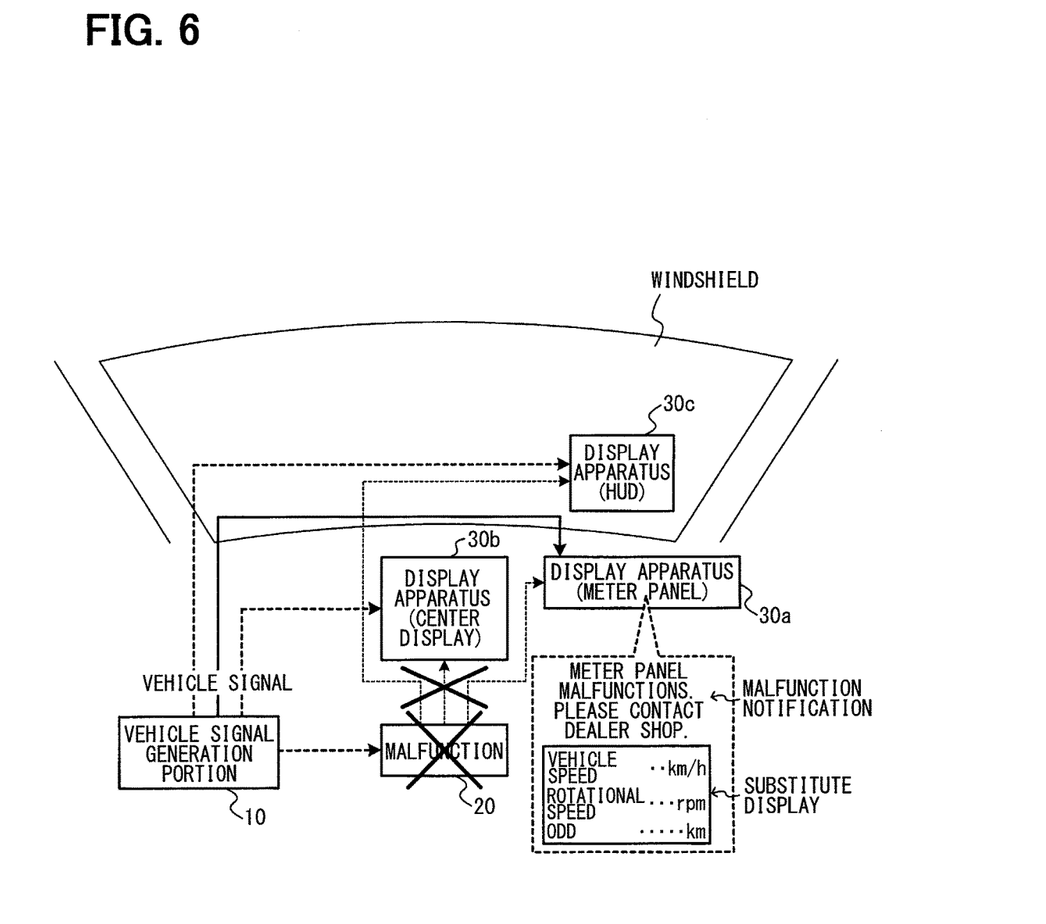
FIG. 6 is a view illustrating an exemplary control in a case where the output control apparatus malfunctions.

FIG. 6 assumes an exemplary case where the output control apparatus 20 malfunctions. In the example, the display apparatus 30a displays minimum required image information out of image information to be displayed by the display apparatus 30a in accordance with a vehicle signal acquired from the vehicle signal generation portion 10, and malfunction information indicating that the output control apparatus 20 malfunctions.

As exemplarily depicted in FIG. 6, the meter panel displays vehicle speed, engine rotational speed, and total travel distance, as minimum required information. The meter panel also displays malfunction notification recommending repair of the malfunctioning output control apparatus. Each of the remaining display apparatuses 30b and 30c displays minimum required image information out of image information to be displayed by the display apparatus in accordance with a vehicle signal self-acquired by the display apparatus from the vehicle signal generation portion 10.

(Effects)

The in-vehicle display system according to the embodiment exerts the following effects.

Even when the output control apparatus 20 malfunctions, which is exclusively configured to integrally control the multiple display apparatuses 30, each of the display apparatuses 30 can self-acquire a vehicle signal and display minimum required image information in accordance with the acquired vehicle signal, as well as malfunction notification.

When malfunction is detected in any of the display apparatuses 30, a different one of the display apparatuses 30 can execute substitute display of minimum required image information out of image information to be displayed by the malfunctioning display apparatus 30, and display malfunction notification. As described above, information necessary for operation can be kept displayed even when the output control apparatus 20 or any of the display apparatuses 30 malfunctions in the in-vehicle display system including the single output control apparatus 20 and the multiple display apparatuses 30.

Modified Examples

The embodiment described above exemplifies the case where each of the display apparatuses 30 has the function of diagnosing malfunction of the output control apparatus 20 (the image diagnosis portion 32) and the function of self-acquiring a vehicle signal and generating image information (the vehicle signal input portion 34 and the image information generation portion 35).

The present disclosure is also applicable to a different case where only a certain part of the display apparatuses 30 configured to display more important information on operation includes the functions of the image diagnosis portion 32, the vehicle signal input portion 34, and the image information generation portion 35. Similarly, only certain part of the display apparatuses 30 configured to display more important information on operation can have the functions of diagnosing malfunction of the corresponding display apparatus 30 and notifying the output control apparatus 20 of a diagnostic result (the self-diagnosis portion 33 and the diagnostic result output portion 37).

The present disclosure has been described with reference to the application examples, but should not be regarded as being limited to the application examples and structures thereof. The present disclosure includes various modification examples as well as modifications within an equivalent scope. Furthermore, various combinations and modes, as well as other combinations and modes further including only one, more than one, or less than one element, should be included in the scope and the spirit of the present disclosure.

What is claimed is:

1. An in-vehicle display system comprising:
a plurality of display apparatuses that are mounted in a vehicle; and
a single control apparatus that is configured to generate image information in accordance with a vehicle signal outputted from the vehicle, output the image information to an assigned one of the plurality of display apparatuses as a display destination of the image information, and cause the assigned one of the plurality of display apparatuses to display the image information, wherein:
a certain display apparatus that is at least one of the plurality of display apparatuses includes
a first detector configured to detect a malfunction of the certain display apparatus,
a second detector configured to detect a malfunction of the single control apparatus,
a transmitter configured to transmit, to the single control apparatus, detection information indicating the malfunction of the certain display apparatus when the first detector detects the malfunction of the certain display apparatus, and
a substitute display controller configured to acquire, when the second detector detects the malfunction of the single control apparatus, a vehicle signal relevant to the image information to be displayed by the certain display apparatus, generate the image information in accordance with the vehicle signal acquired, and display the image information generated; and
the single control apparatus includes
an output controller configured to output, to a different display apparatus of the plurality of display apparatuses, the image information assigned to the certain display apparatus as the display destination, upon receipt of the detection information indicating the malfunction of the certain display apparatus from the certain display apparatus, and cause the different display apparatus to display the image information.

2. The in-vehicle display system according to claim 1, wherein:
the output controller of the single control apparatus is configured to output, to the different display apparatus, only certain image information satisfying a necessary condition of minimum required information for operation of the vehicle, out of the image information assigned to the certain display apparatus relevant to the detection information as the display destination, and cause the different display apparatus to display the certain image information.

3. The in-vehicle display system according to claim 1, wherein:
the substitute display controller of the certain display apparatus is configured to display information indicating the malfunction of the single control apparatus when the malfunction of the single control apparatus is detected.

4. The in-vehicle display system according to claim 1, wherein:
the output controller of the single control apparatus is configured to transmit information indicating the malfunction of the certain display apparatus to the different display apparatus and cause the different display apparatus to display the information.

5. A control apparatus configuring the in-vehicle display system according to claim 1.

6. A display apparatus configuring the in-vehicle display system according to claim 1.

7. The in-vehicle display system according to claim 1, wherein:
the single control apparatus is configured to store the image information displayed when the malfunction of the certain display apparatus is detected; and
the output controller is configured to output certain image information satisfying a condition stored in the single control apparatus to the different display apparatus to cause the different display apparatus to display the certain image information.

8. The in-vehicle display system according to claim 1, wherein:
the vehicle signal indicates a vehicle state; and
the image information is generated by imaging the vehicle information.

* * * * *